March 8, 1960 H. A. FOHRHALTZ ET AL 2,927,781
MEANS FOR CLAMPING TUBULAR MEMBERS
Filed Nov. 15, 1957 2 Sheets-Sheet 1
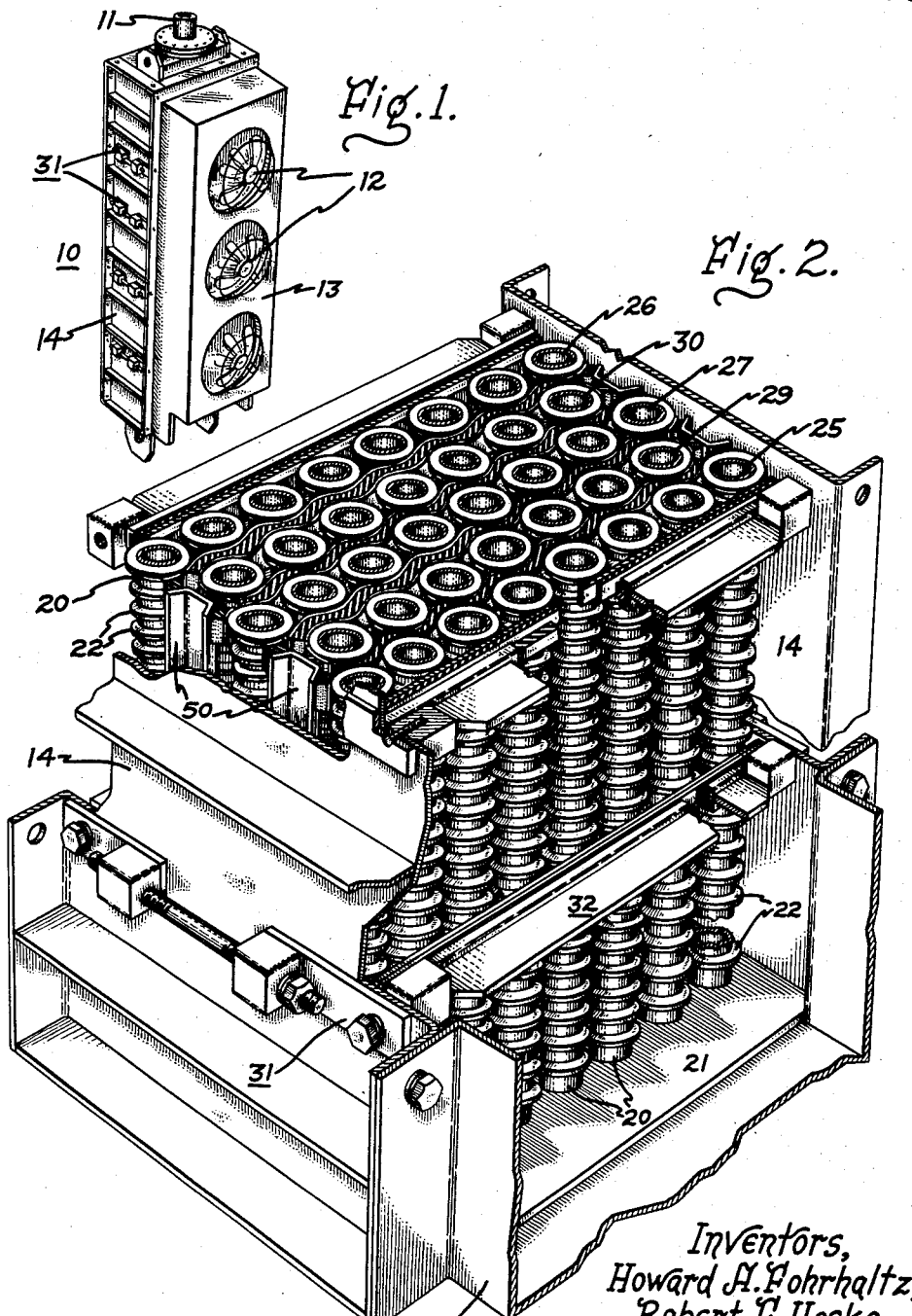
Inventors,
Howard A. Fohrhaltz,
Robert F. Hasko,
Richard A. Ochs,
by Gilbert P. Tarleton
Their Attorney.

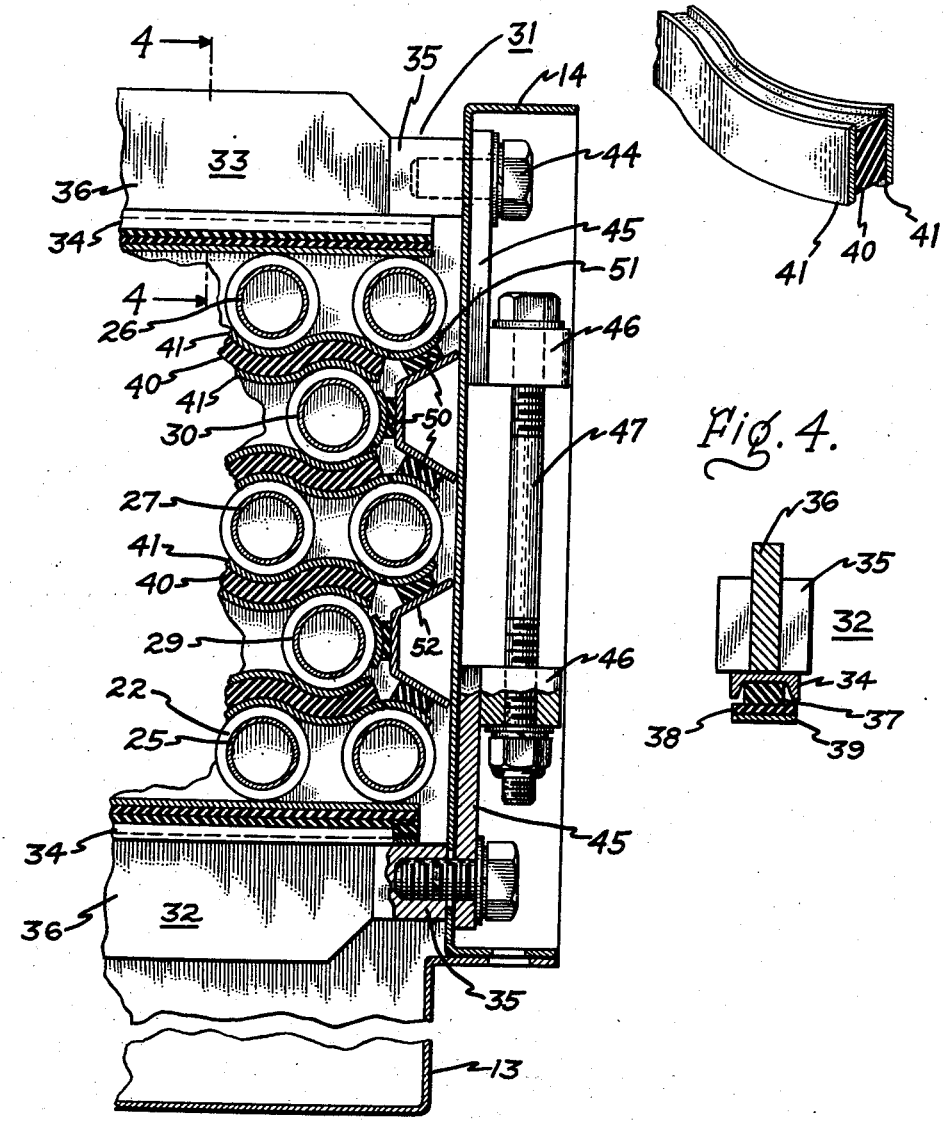

United States Patent Office 2,927,781
Patented Mar. 8, 1960

2,927,781

MEANS FOR CLAMPING TUBULAR MEMBERS

Howard A. Fohrhaltz, Pittsfield, Robert F. Hasko, Monterey, and Richard A. Ochs, Pittsfield, Mass., assignors to General Electric Company, a corporation of New York Application November 15, 1957, Serial No. 696,656

7 Claims. (Cl. 257—248)

This invention relates to means for clamping tubular members, and more in particular to improved means for transversely clamping a plurality of externally finned tubes in a transverse plane intermediate their ends. While the following disclosure particularly relates the invention to radiators for transformers, it will be obvious that the invention is not thus limited, and may, for example, be employed on heat exchange devices for other types of apparatus, without departing from the spirit or scope thereof.

Heat exchange devices are frequently comprised of a plurality of parallel heat exchange tubes extending between a pair of headers, with one fluid being circulated externally of the tubes and another fluid being circulated through the tubes. In order to increase the heat exchange between the fluids, the tubes are generally provided with external fins. When the length of tubes is very great, means must be provided intermediate the ends of the tubes to prevent excess vibration of the tubes that may result in damage to the heat exchange device. The bracing is of special importance when the heat exchange device is employed on apparatus that inherently produces vibrations of substantially constant frequency, such as transformers, since the vibration of the tubes becomes especially severe when the tubes have such dimensions that they may vibrate at the fundamental or harmonic frequencies of the vibrations produced by the apparatus. While the vibration of the tubes may be reduced by proper selection of the tube length, this is not a practical solution since other factors must also be considered in the determination of the length of the tubes, such as heat transfer efficiency, required pumping power for pumping fluids through the tubes, and the possible necessity for interchangeability of the heat exchanger with existing equivalent.

In the past, heat exchange devices (i.e., radiators) for transformers have frequently been comprised of parallel copper tubes joined together in rows by elongated fins to form relatively rigid slabs, each slab, for example, containing six tubes. A number of such slabs were assembled, with the tubes in adjacent rows being staggered, to form the complete radiator, and in order to facilitate clamping of the tubes intermediate their ends, the fins were either removed or, more generally, not provided at specific regions along the length of the tubes. This permitted the provision of clamping means directly engaging the copper tubes. In view of the relative rigidity of the tubes, and the fact that the surfaces of the tubes were exposed for clamping, the requirements for intermediate clamping means were not great. For example, sufficient bracing was obtained by inserting notched plates between the rows of tubes, with the notches in the plates engaging the portions of the tubes having no fins, and providing means for clamping together the outermost plates such as, for example, tie rods extending diagonally through the rows of tubes and affixed to the outermost plates.

It is now desirable, however, to employ aluminum heat exchange tubes in transformer radiators, since aluminum tubes offer substantial economical advantages. A typical aluminum heat exchange tube, such as is disclosed in U.S. Letters Patent No. 2,463,997, J. S. Rodgers, is provided with helical external fins extruded from the peripheral portion of the tube. The use of such tubes has been found to introduce new problems in the fabrication of heat exchange devices, since removal of the fins (e.g., by machining) to expose portions of the tubes for clamping is costly, and the processes employed in fabricating the tube are not adaptable to formation of tubes having intermediate portions without fins. As a result, it is desirable that clamping means be provided that engage the external fins of the tubes.

While it has been proposed that the previously employed notched plate arrangement be employed to clamp the tubes, with the notches in the plates engaging fins of the tubes, this would require an undesirable increase in the spacing of the tubes in order that the plates have sufficient strength to rigidly hold the tubes. The necessary strength of the clamping means is also increased due to the fact that the aluminum tubes are less rigid than the previously employed copper finned tubes, and the aluminum tubes are not joined together by fins to increase their rigidity. It is thus desirable that the clamping means provide a clamping pressure on the tube in all transverse directions.

It is therefore an object of this invention to provide an improved clamping arrangement for clamping a plurality of tubular members.

Another object is to provide improved means for transversely clamping a plurality of parallel externally finned tubes intermediate their ends, the clamping means providing clamping pressure directly on the fins of the tubes and requiring a minimum of space.

It is a further object of this invention to provide means for transversely clamping a plurality of parallel externally helically finned aluminum tubes intermediate the ends of the tubes, to form a rigid bundle of tubes, the clamping means acting directly on the external fins of the tubes and requiring a minimum of space, and providing clamping pressure on the tubes in all transverse directions.

Briefly stated, in accordance with one aspect of the invention, we provide means for transversely clamping a plurality of parallel tubular members arranged in a plurality of parallel rows of coplanar members. The tubular members may be staggered in adjacent rows of members. Means comprising strips of resilient material are provided extending transversely of the members between and separating adjacent rows of the members, the resilient means extending in a plane transverse to the axes of the tubular members. The resilient means may, for example, comprise strips of a resilient material lined with metallic strips on the sides thereof that engage the fins of the tubular members. First clamping means are provided that act on the outermost rows of tubular members in the transverse plane, and clamps the rows together. Second clamping means are provided that act on the end tubular members in each of the rows in the transverse plane, and prevent movement of the end members away from the rows.

While the specification concludes with claims particularly pointing out and distinctly claiming the subject matter which we regard as our invention, it is believed that the invention will be better understood from the following description taken in connection with the accompanying drawing.

In the drawings,

Fig. 1 is a perspective view of a typical heat exchange unit that may be employed for cooling the dielectric fluid of a transformer, Fig. 2 is an enlarged partially cross-sectional perspective view of the heat exchange unit of Fig. 1 and illustrating the tube clamping arrangement of this invention, Fig. 3 is a cross-sectional view of a portion of the heat exchange unit of Figs. 1 and 2, Fig. 4 is a cross-sectional view of a portion of the heat exchange unit of Fig. 3 taken along the line 4—4, and Fig. 5 is a perspective view of a portion of the strips extending between the heat exchange tubes of the heat exchange unit of Figs. 2 and 3.

Referring now to the drawings, and more in particular to Fig. 1, therein is illustrated a typical heat exchange unit 10 (i.e., radiator) such as may be employed for cooling the dielectric fluid of a transformer. The dielectric fluid is directed into one end of the unit, for example by way of the upper conduit 11, across one side of a heat exchange surface or surfaces in the central portion of the radiator, and out of the radiator for example through a lower conduit (not shown). Air may be forced, by means of fans 12 across the other side of the heat exchange surface or surfaces to carry off the heat of the dielectric fluid. A suitable enclosure 13 is provided surrounding the fans, and serves to direct the air toward the heat exchange surfaces, and suitable baffle plates 14 may be provided on the sides of the radiator so that all of the air from the fans must pass through the radiator in contact with the heat exchange surfaces.

Referring now to Fig. 2, which illustrates an enlarged partially cross-sectional view of the radiator of Fig. 1, the heat exchange surfaces are comprised of a plurality of parallel heat exchange tubes 20 extending between upper and lower tube plates (only the lower tube plate 21 appearing in the illustration for the sake of clarity). The tubes 20, which are preferably aluminum, communicate with upper and lower headers (not shown) which are connected to external conduits such as the conduit 11 of Fig. 1. Thus, when the radiator 10 is employed for cooling the dielectric fluid of a transformer, the dielectric fluid is directed longitudinally through the tubes 20. The fans 12 of Fig. 1 are arranged to direct air across the external surfaces of the tubes 20 and generally transversely of their axes.

The tubes 20 are provided with external fins 22 in order to improve the heat transfer from the dielectric fluid to the air, and these fins may be separate or helical, and may be formed either separately or integrally with the tube. While the present invention is particularly useful when the fins are extruded from the tube, as has been previously stated, it will be obvious that the arrangement may also be advantageously employed when the fins are separately formed.

The tubes 20 are arranged in parallel rows, each row having a plurality of tubes, and the tubes of adjacent rows are staggered. For example, as illustrated in Fig. 2, the outer rows 25 and 26 and the center row 27 each have eight evenly spaced tubes, the tubes in these three rows being aligned. The row 29 separating rows 25 and 27 and the row 30 separating the rows 26 and 27 each have seven tubes, the tubes of rows 29 and 30 being aligned and extending in planes midway between the planes of aligned tubes in the rows 25, 26 and 27. It will be understood, of course, that more or less numbers of rows of tubes and numbers of tubes in each row may be employed without departing from the spirit or scope of the invention, the above example being purely illustrative.

In order to hold the tubes against vibration and mechanical damage, transverse clamping means 31 are provided at one or more locations along the length of the tubes.

Referring now to Figs. 2 and 3, each of the transverse clamping means 31 is comprised of elongated tube clamp or bracing members 32 and 33 extending transversely of the axes of the tubes and contacting the outermost sides of the outer tube rows 25 and 26 respectively. The bracing members 32 and 33 are comprised of channel members 34 (see Figs. 3 and 4) extending transversely along the sides of the outer tube rows and having blocks 35 welded or rigidly affixed to each end. Bracing plates 36 may be provided extending in a plane transversely of the tubes welded on the side of the channel away from the tubes in order to provide additional strength. It will be obvious, of course, that other bracing structures may be employed to impart transverse forces to the sides of the rows of tubes. The channel members 34 have their open sides toward the tubes, and strips 37 of resilient material are provided within the open sides. Additional strips 38 of resilient material such as rubber are provided on the side of the strip 37 toward the tubes, the strips 38 extending substantially the full width of the channel members 34. It will be obvious, of course, that the strips 37 and 38 may instead comprise one strip of material having substantially the same overall shape. In order to prevent cutting of the strip 38 of resilient material by the fins of the tubes 20, the side of the strip 38 toward the tubes is lined with a strip 39 of metallic material, preferably the same material as that of which the fins are formed.

Strips 40 of resilient material such as rubber are also provided between adjacent rows of tubes, the strips 40 also being preferably lined with strips 41 of metallic material on the sides contacting the tubes in order to prevent cutting of the material 40. As illustrated in Fig. 5, it is preferred that the strips 41 have a slightly greater width than the strip of material 40 in order that the material 40 will not engage the fins upon compression thereof due to clamping pressure applied to the tubes. Since the tubes in adjacent rows are staggered, the lined strips 40 circumferentially engage the fins of the tubes and assume a sinuous shape.

Each of the bracing members 32 and 33 are bolted to plates 45 extending around the ends of the tube rows, and blocks 46 are welded or otherwise firmly attached to the ends of the plates 45 toward the centers of the radiator. Bolts 47 are provided extending through apertures in the blocks 46 in order to provide clamping pressure to the members 32 and 33 to tend to force the rows of tubes together. The bolts 44 which hold the plates 45 to the bracing members 32 and 33 also hold the side baffles 14 against the ends of blocks 35, and the apertures in the baffles 14 through which the bolts 44 extend are elongated in order to permit the transverse movement of the members 32 and 33 without buckling of the baffles 14.

In order to provide transverse clamping on the ends of the rows of tubes, and thereby prevent spreading apart of the tubes in each row upon applying clamping pressure to the plates 32 and 33, blocks 50 of resilient material are provided engaging the end tubes in each row, the blocks 50 being also preferably lined with metallic strips 51 to prevent cutting of the resilient material by the fins. These blocks 50 are preferably held to the sides of channel-shaped members 52 affixed to the side of the baffle member 14 toward the tubes, the channel-shaped members extending parallel to the tubes. Thus, as illustrated in Figs. 2 and 3, one channel-shaped member 52 is provided on each end of the rows 29 and 30, and the blocks 50 on the web of the members 52 engage the end tubes in the rows 29 and 30. The blocks 50 on the flanges of the channel-shaped members 52 engage the end tubes of the rows of tubes 25, 26 and 27. Aside from supporting the blocks 50, the channel members 52 also afford mechanical strength to the side baffles 14 and direct the air moving in the vicinity of the baffles 14.

From the above disclosure it is seen that tightening of the bolts 47 forces the bracing members 32 and 33 closer together. This results in the tendency of the tubes in each row to spread apart, but by providing the clamping blocks 50 engaging the end tubes in each row, spreading apart of the tubes is prevented. Thus, aside from forcing the rows of tubes together, tightening of the bolts 47 also clamps the end tubes in each row firmly against the clamping blocks 50. Thus, the arrangement of this invention firmly clamps the tubes 20 in all transverse directions.

As an example of a heat exchange unit according to this invention, it has been found that when helical finned aluminum tubing having a fin diameter of about 1.5 inches was employed, satisfactory clamping was obtained when the rubber strips 40 had thicknesses from 1/8 to 3/8 inch and widths of about one inch, the rubber strips 38 had thicknesses of about 1/8 inch and widths of about 1 inch, the strips 37 were about 5/8 inch wide and have thicknesses of about 3/8 inch, and the thickness of the metallic layers on all of the resilient strips was about .01 inch. In this example, the tubes 20 had about 9 fins per inch.

It will be understood, of course, that while the form of the invention herein shown and described constitutes the preferred embodiment of the invention, it is not intended herein to illustrate all of the possible equivalent forms or ramifications thereof. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What we claim as new and desire to secure by Letters Patent of the United States is:

1. A plurality of parallel tubular members arranged in a plurality of parallel rows of coplanar members, means for transversely clamping said members, said means comprising strips of resilient material extending transversely of said members between and separating adjacent rows of said members, first clamping means acting on the outermost rows and clamping said rows together, and second clamping means acting on the end members of each of said rows and preventing movement of said end members away from said rows.

2. A plurality of parallel tubular members arranged in a plurality of parallel rows of coplanar members, means for clamping said members, said means comprising resilient means extending transversely of said members between and separating said rows in a transverse plane intermediate the ends of said members, first clamping means acting on the outermost rows of members in said plane and clamping said rows together, and second clamping means acting in said plane on the endmost members of each of said rows and preventing movement of said end members away from said rows.

3. A plurality of externally finned tubular members arranged in a plurality of rows of coplanar members, said members having a staggered relationship in adjacent rows and means for clamping said members, said clamping means comprising resilient means extending between said rows in a transverse plane intermediate the ends of said members, said resilient means circumferentially engaging the fins of said tubular members, clamping plate means engaging the fins of the tubular members of the outermost rows of members in said plane, adjustable clamping means extending in said plane around the ends of said rows and joining said clamping plate means to provide clamping pressure to said clamping plate means to clamp said rows together, and means on said adjustable clamping means engaging the endmost tubular members of each of said rows.

4. The clamping means of claim 3 in which said resilient means comprises strips of resilient material lined with metallic strips on the sides thereof engaging said fins.

5. A plurality of externally helical, finned aluminum tubular members arranged in a plurality of rows of coplanar members, said members having a staggered relationship in adjacent rows, and means for transversely clamping said members, said clamping means comprising resilient strip means extending between said rows in a transverse plane intermediate the ends of said members, said resilient means circumferentially engaging the fins of said tubular members, first and second rigid clamping plate means disposed on opposite sides of said tubular members and having resilient surfaces engaging the fins of the tubular members of the outermost rows of members in said plane, end plate means extending across the ends of said rows in said plane, resilient projection means on said end plate means engaging the fins of the endmost members in said rows, adjustable means connected to the ends of said first and second clamp plate means and extending across the ends of said rows to clamp said rows together, said end plate means being adjustably mounted on the ends of said clamp plate means to provide clamping pressure on the ends of said rows.

6. The clamping arrangement of claim 5 in which said resilient strip means, resilient surfaces, and resilient projection means are comprised of rubber lined with thin metallic layers on the sides thereof engaging said fins.

7. The clamping arrangement of claim 5 in which said adjustable means comprises a clamping bolt extending between block and plate means bolted to each end of each of said clamping plate means, the bolts holding said block and plate means to said clamping plate means extending through slots in said end plate means to provide adjustable mounting for said end plate means.

References Cited in the file of this patent

UNITED STATES PATENTS

| | | |
|---|---|---|
| 1,748,140 | Muhleisen | Feb. 25, 1930 |
| 2,026,312 | Houts | Dec. 31, 1935 |
| 2,166,808 | Flindt | July 18, 1939 |
| 2,402,209 | Ryder | June 18, 1946 |
| 2,735,658 | Cook | Feb. 21, 1956 |
| 2,851,751 | Henry | Sept. 16, 1958 |

UNITED STATES PATENT OFFICE
CERTIFICATE OF CORRECTION

Patent No. 2,927,781                         March 8, 1960

Howard A. Fohrhaltz et al.

It is hereby certified that error appears in the printed specification of the above numbered patent requiring correction and that the said Letters Patent should read as corrected below.

Column 1, line 34, for "exchage" read -- exchange --; column 4, line 38, after "Each" insert -- end --.

Signed and sealed this 16th day of August 1960.

(SEAL)
Attest:

KARL H. AXLINE                                    ROBERT C. WATSON
Attesting Officer                                 Commissioner of Patents